US011151847B2

(12) United States Patent
Candido De Lima Junior et al.

(10) Patent No.: US 11,151,847 B2
(45) Date of Patent: Oct. 19, 2021

(54) SECURING EXTERNAL COMMUNICATION PORTS IN AUTOMATED TELLER MACHINES

(71) Applicant: International Business Machines Corporation, Armonk, NY (US)

(72) Inventors: Juscelino Candido De Lima Junior, Campinas (BR); Antonio Joao Schwartz Soares, Itatiba (BR); Carlos Eduardo Seo, Sao Paulo (BR); Camilla da Graca Portes Ogurtsova, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/816,410

(22) Filed: Mar. 12, 2020

(65) Prior Publication Data

US 2021/0287496 A1 Sep. 16, 2021

(51) Int. Cl.
*G06Q 40/00* (2012.01)
*G07F 19/00* (2006.01)

(52) U.S. Cl.
CPC .......... *G07F 19/209* (2013.01); *G07F 19/207* (2013.01)

(58) Field of Classification Search
CPC ... G07F 19/209; G07F 19/2055; G07F 19/207
USPC .......................................................... 235/379
See application file for complete search history.

(56) References Cited

U.S. PATENT DOCUMENTS

| | | | | |
|---|---|---|---|---|
| 5,598,793 | A | 2/1997 | Lopez, Jr. | |
| 8,025,214 | B1 | 9/2011 | Folk | |
| 10,504,096 | B1 * | 12/2019 | Hafemann | G06F 3/044 |
| 2008/0251578 | A1 | 10/2008 | Jansing | |
| 2015/0213428 | A1 * | 7/2015 | Hodges | H04K 3/822 705/18 |
| 2020/0118397 | A1 * | 4/2020 | Yang | G07F 19/207 |

FOREIGN PATENT DOCUMENTS

| | | | |
|---|---|---|---|
| CN | 101266704 | B | 11/2010 |
| CN | 106685961 | A | 5/2017 |
| EP | 2595124 | A1 | 5/2013 |

OTHER PUBLICATIONS

"Guidance and recommendations regarding logical attacks on ATMs", Mitigating the risk, setting up lines of defence identifying and responding to logical attacks, EUROPOL, Printed Feb. 12, 2020, 10 pages.

(Continued)

*Primary Examiner* — Ahshik Kim
(74) *Attorney, Agent, or Firm* — Jordan A. Lewis; Brian M. Restauro

(57) ABSTRACT

Embodiments of the present invention provide a computer system, a computer program product, and a method that comprises identifying at least a first physical sensor and a second physical sensor within a computing device, wherein each physical sensor is associated with a respective count; performing a predetermined operation within the computing device; authenticating the received command of at least the first physical sensor and the second physical sensor identified within the computing device; and automatically halting the operation of the computing device.

20 Claims, 4 Drawing Sheets

(56) References Cited

OTHER PUBLICATIONS

Engelbrecht, Stan, "The Latest Threats to ATM Security", SECURITYWEEK, Jan. 4, 2019, Copyright© 2020 Wired Business Media, 6 pages, <https://www.securityweek.com/latest-threats-atm-security>.

Smith, Mark, "Protective Measure to Protect Your ATMs Against Jackpotting", PaymentsJournal, Sep. 10, 2018, 6 pages, <https://www.paymentsjournal.com/protective-measure-to-protect-your-atms-against-jackpotting/>.

* cited by examiner

SECURING EXTERNAL COMMUNICATION PORTS IN AUTOMATED TELLER MACHINES

FIELD OF INVENTION

The present invention relates generally to the field of information security, and more specifically securing information in automated teller machines.

BACKGROUND

An automated teller machine ("ATM") is an electronic telecommunications device that enables customers of financial institutions to perform financial transactions, such as cash withdrawals, deposits, transfer funds, or obtaining account information, at any time and without the need for direct interaction with bank staff. Customers are typically identified by inserting a plastic ATM card into the ATM, with authentication occurring by the customer entering a personal identification number ("PIN"), which must match the PIN stored in the chip on the card or in the issuing financial institution's database.

An ATM is subject to attacks that involve manually planting malware or connect devices to control cash dispensing. The common solutions focus on mitigating two used attacks, which include the "black box" attack and the "exit from kiosk mode" attack. Black Box attacks focus on exploiting the connection between the cash dispenser and the ATM computer. Criminals can drill holes to gain access to the dispenser cable and connects single-board computers to run modified versions of ATM diagnostic utilities to gain access to the cash dispenser.

The exit from kiosk mode attack persists if the attacker is successful in exiting kiosk mode within the operating system of the ATM. This step will allow the attacker to bypass the restrictions and run privileged commands within the ATM's operating system. Generally, this is performed by entering a USB device to emulate keyboard inputs on the ATM, the use of hotkeys, or via a firewall connection that provides direct access to memory.

SUMMARY

Embodiments of the present invention provide a computer system, a computer program product, and a method that comprises identifying at least a first physical sensor and a second physical sensor within a computing device, wherein each physical sensor is associated with a respective count; performing a predetermined operation within the computing device; authenticating the received command of at least the first physical sensor and the second physical sensor identified within the computing device; and automatically halting the operation of the computing device.

DETAILED DESCRIPTION

Embodiments of the present invention recognize the need for solutions to attacks on ATMs using specific programing in an environment comprised of computing devices. Embodiments of the present invention provides systems, methods, and computer program products for a solution to black box attacks and exit from kiosk mode attacks on ATMs. Currently, most ATMs are vulnerable to black box attacks, and even more ATMs are vulnerable to exit from kiosk mode attacks. Generally, to prevent black box attacks, vendors recommend physical authentication between the operating system and the cash dispenser. However, this is also prone to vulnerabilities as attackers can manipulate sensors in the cash dispenser to simulate physical authentication. Generally, to prevent the exit from kiosk mode attack, a series of recommendations may be applied such as removing any unnecessary software, disabling standard key combinations, or other guidelines. Embodiments of the present invention are an improvement to solutions for those attacks on ATMs by increasing the security of the ATM. Embodiments of the present invention leverages e-fuse programming technology in order to perform automatic maintenance control within the ATM, which would monitor and prevent attempted attacks on the ATM. Embodiments of the present invention places the e-fuse chip set on the ATM computing device and the ATM cash dispenser, allowing open communication between the chip set. Embodiments of the present invention immediately creates a notification upon an enabled external connection match that does not align with the e-fuse chip set.

Figure 1:
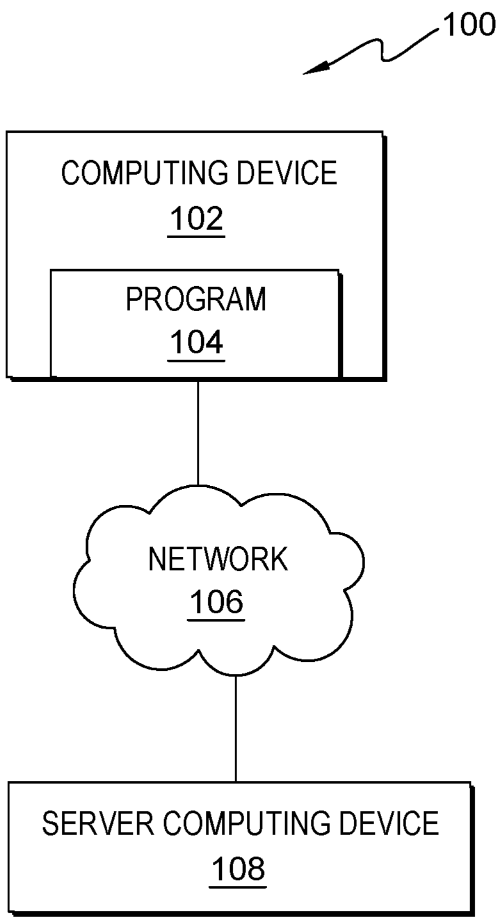
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, ATMs, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, cable of executing machine-readable program instructions, as described in greater detail with regard to FIG. 5.

The computing device 102 may include a program 104. The program 104 may be a stand-alone program on the computing device 102. In another embodiment, the program 104 may be stored on a server computing device 108. In another embodiment, the program 104 may be stored within a bootloader located within the computing device 102. In this embodiment, the program 104 improves security of computing devices 102 by performing a self-verifying accounting system. In this embodiment, the program 104 detects an external connection, counts the cash dispenser amount, matches the external connection and the count of the amount, verifies the match, and automatically notifies a user upon the external connection and the count not matching. These are examples of commands that the program 104 may receive before detecting a predetermined operation. In this embodiment, the program 104 detects a predetermined operation that is linked with a first physical sensor and a second physical sensor. Each physical sensor may be associated with a corresponding and respective count. The physical sensor may be an e-fuse or another type of physical sensor capable of counting. In this embodiment, the program 104 leverages an accounting system that uses self-verification.

In another embodiment, the program leverages an e-fuse programming technology. E-fuse is a programing technology that allows for the dynamic real-time reprogramming of computer chips, provides in-chip performance tuning, and prevents downgrading the firmware of a device. In this embodiment, the program 104 focuses on the operating system of the ATM and the cash dispenser of the ATM. The program 104 accomplishes this task by burning at least one e-fuse at each triggered step; therefore, this embodiment requires at least two e-fuses to be used, one on the operating system and one on the cash dispenser. Burning an e-fuse is defined as a check system that allows the program 104 to know that the proper instructions have been received and processed. In this embodiment, a key is used to burn an e-fuse, and the burning of an e-fuse occurs before an external device is connected. In this embodiment, the program 104 receives an input signal generated from a key or an operator.

In another embodiment, the program 104 transmits instructions to a bootloader to turn the key connected to each e-fuse prior to the e-fuse burning and an external device connection. In another embodiment, an external device connected interprets the instructions received by each e-fuse within the ATM. In this embodiment, the program 104 analyzes the first and second physical sensors and theirs associated counts in response to performing the predetermined operation. In another embodiment, the bootloader that houses the program 104 analyzes the information interpreted by the external device to determine that the instructions on each e-fuse match.

In this embodiment, in response to an issue of the self-verification accounting system or a positive authentication, the program 104 automatically halts the operation of the computing device 102. In another embodiment, in response to instructions that match on all e-fuses within the ATM or a negative authentication, the program 104 proceeds with the requested operations. In this embodiment, the program 104 performs a transmission. The transmission is defined as sending an alert to an operator, to the bank, or to the authorities. In other embodiments, the program 104 may also generate additional security questions or deploy a stall tactic while simultaneously alerting authorities. For example, this stall tactic may request a series of authentication questions as an extra security protocol. When the predetermined operation fails, this is generally a result of the first physical sensor within the computing device 102 (e.g., the e-fuse located on the operating system of the ATM) and the second physical sensor within the computing device 102 (e.g., the e-fuse located on the cash dispenser of the ATM) not equaling each other, which may be a simple maintenance issue or a compromised computing device 102. This is also defined as a positive authentication between the first and second physical sensors. In another embodiment, the program 104 may determine if there is an active attack currently being performed on the computing device 102 or if there a routine maintenance issue that resembles an attack on the computing device 102.

The network 106 can be a local area network ("LAN"), a wide area network ("WAN") such as the Internet, or a combination of the two; and it may include wired, wireless, or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network. The server computing device 108 may be a single computing device, a laptop, a cloud-based collection of computing devices, a collection of servers, and other known computing devices. In this embodiment, the server computing device 108 may be an external device connected to the computing device 102 via the network 106 to assist the program 104 in transmitting an alert in response to the program 104 halting a transaction. In another embodiment, the server computing device 108 may communicate with at least one physical sensor located within the computing device 102. In another embodiment, the server computing device 108 communicates with the program 104 housed within the bootloader using out of band communication.

Figure 2:
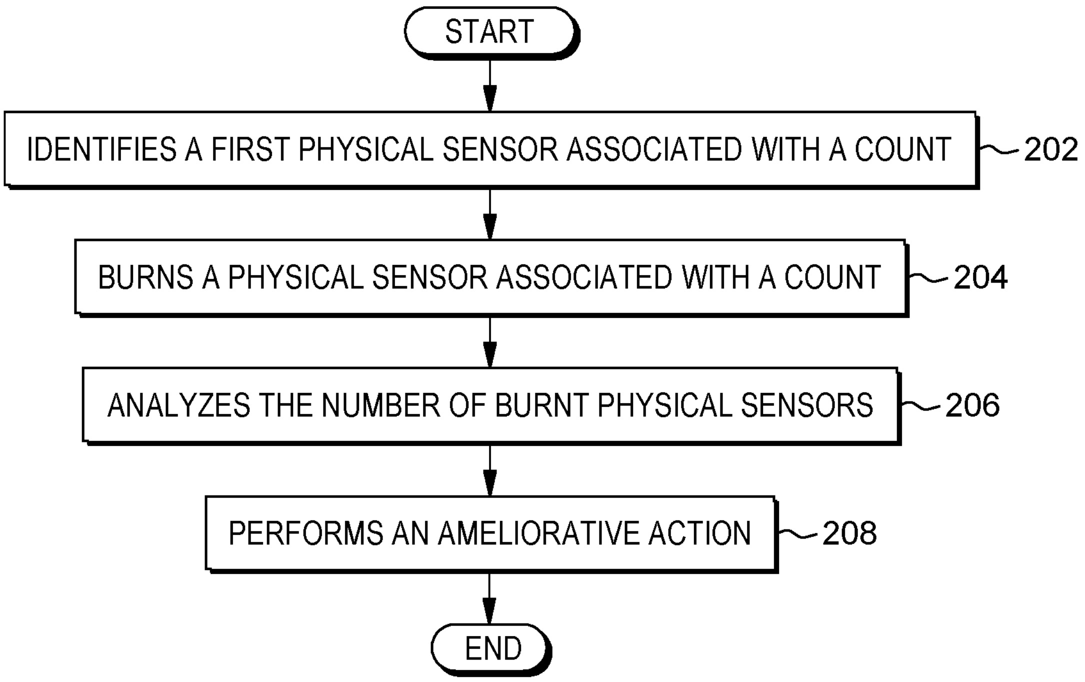
FIG. 2 is a flowchart illustrating operational steps for securing external communication in an ATM using electronic keys, in accordance with at least one embodiment of the present invention.

FIG. 2 is a flowchart illustrating operational steps for securing external communication in an ATM using electronic keys.

In step 202, the program 104 identifies a first physical sensor associated with a count within the computing device 102. In this embodiment, the program 104 accesses the schematics of the computing device 102 to map the general layout of the computing device 102. In this embodiment, the program 104 performs a diagnostic test to identify a number of physical sensors associated with respective counts that are located within the computing device 102. In response to accessing the schematics and running a diagnostic test, the program 104 locates at least a first physical sensor and a second physical sensor, each associated with respective, different counts. In another embodiment, the program 104 locates at least two e-fuses within the ATM, and there is at least one e-fuse on the operating system of the ATM and one e-fuse on the cash dispenser of the ATM. In this embodiment, the program 104 transmits instructions to the first physical sensor within the computing device 102 to relay information to the program 104. In another embodiment, the program 104 transmits instructions to the first physical sensor to give a count and count types. In another embodiment, the program 104 transmits instructions to at least two e-fuses located within the ATM to relay information to the program 104 and to communicate with each other. For example, the program 104 locates the e-fuse located on the operating system of the ATM and the e-fuse located on the cash dispenser and transmits instructions for the e-fuses to communicate with each other, while also relaying any information they receive back to the program 104.

In step 204, the program 104 burns a physical sensor associated with a count within the computing device 102. In this embodiment, the program 104 burns the physical sensor associated to the count within the computing device 102 in response to the program 104 identifying the presence of an electronic key. In this embodiment, the program 104 receives an input signal generated from an electronic key that causes the program 104 to transmit instructions to the first physical sensor to begin an operation. In this embodiment, the physical sensor is burned when it receives the instructions from the program 104. In another embodiment, the program 104 transmits instructions to an electronic key to activate, and upon its activation, the e-fuse associated with that electronic key is burned. The number of e-fuses expected to be brunt depends on the installation of the computing device 102, the number of instructions transmitted, and the number of instructions received. In this embodiment, the number of physical sensors burned is a part of the self-verification accounting system of the program 104. For example, the program 104 receives instructions to dispense an amount of money from the ATM, and the program 104 then transmits those instructions to the physical sensor connected to the cash dispenser. This transmission will burn the burn the physical sensor located on the cash dispenser.

In step 206, the program 104 analyzes the number of burnt physical sensors within the computing device 102. In this embodiment, the program 104 analyzes the number of burnt physical sensors associated with respective counts by transmitting signals to those physical sensors and authenticating the signals. A burnt physical sensor will no longer be able to receive or transmit instructions until a transaction is completed, and this is defined as a compromised physical sensor. In another embodiment, the program 104 analyzes the number of burnt e-fuses by transmitting signals to the e-fuses and authenticating the number of signals returned to the program 104. For example, the program 104 transmits signals to the first physical sensor located on the operating system of the ATM and to the second physical sensor located on the cash dispenser of the ATM and verifies the signals that are returned to the program 104. In another embodiment, the program 104 activates the electronic key that is associated with each physical sensor and verifies the signals returned to the program 104 from the physical sensors connected to the electronic keys. This analysis will be discussed in greater detail in FIG. 3.

In step 208, the program 104 performs an ameliorative action. In this embodiment, the program 104 performs an ameliorative action in response to analyzing the number of burnt physical sensors associated with counts. The ameliorative action is defined as performing a transmission, halting a transmission, and transmitting a notification. In this embodiment and in response to authenticating the transmitted signals from the physical sensors associated with counts, the program 104 automatically performs a transmission. The transmission may be any operation that can be performed by the computing device 102. In another embodiment and in response to program 104 failing to authenticate transmitted signals to the physical sensors located associated with counts, the program 104 automatically halts the transmission of the computing device 102. An authentication failure occurs when the number of physical sensors burned does not align with the number of physical sensors that received signals, and the program 104 uses the self-verification accounting system to analyze the physical sensors. In this embodiment, the program 104 will not receive a signal from a burnt physical sensor, and the self-verification accounting system counts the physical sensors associated with counts, the burnt or compromised physical sensors, and the physical sensors that returned a signal to the program 104. In response to receiving the initial signal from the program 104, the physical sensor burns and loses the ability to return signals to the program 104. The program 104 authenticates the signal received from the physical sensors associated with counts. Therefore, the program 104 automatically halts the transmission of the computing device 102 in the event that a different number of signals are returned to the program 104 from the number of signals transmitted by the program 104, which constitutes an authentication failure. For example, the program 104 automatically halts the operation of the ATM when the program 104 transmits two signals to the physical sensors located within the ATM, but four signals are returned to the program 104. In another embodiment, the program 104 halts the operation of the ATM when the program 104 determines that the number of burnt e-fuses differs from the number of signals transmitted by the program 104. In another embodiment and in response to automatically halting the transmission of the computing device 102, the program 104 transmits a transmits a notification to the server computing device 108. In another embodiment, the program 104 transmits a notification to an operator, bank, or authorities that details the reasoning for halting the transmission, the type of attack that was attempted on the computing device 102, the time of the attack, and stalling tactics to allow the authorities to reach the computing device 102. For example, the program 104 transmits a notification to an operator detailing that the physical sensor on the cash dispenser returned more signals than the program 104 transmitted to that physical sensor, the time the attack took place was 8:55 a.m., and the program 104 asked three additional security questions in an effort to stall the suspect until the authorities reached the location of the computing device 102.

Figure 3:
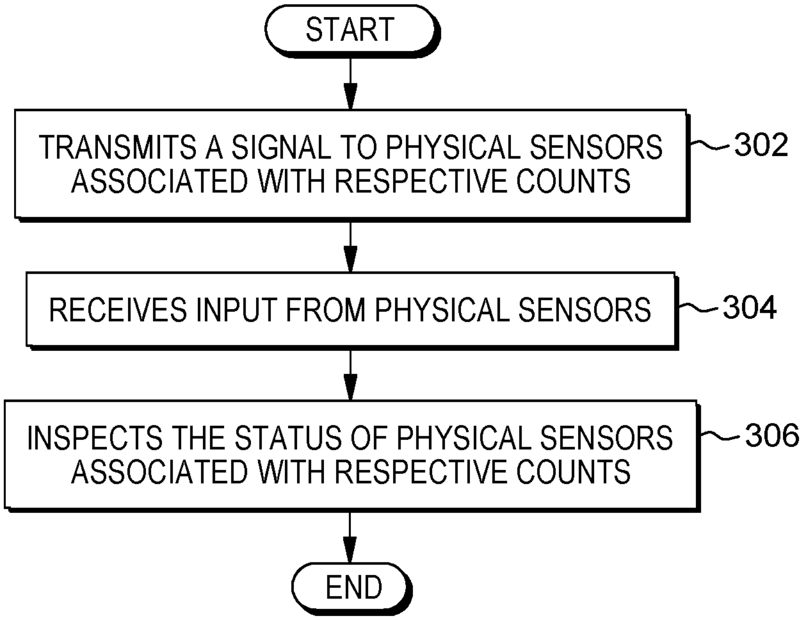
FIG. 3 is a flowchart illustrating operational steps for analyzing a number of burnt physical sensors located within an ATM, in accordance with at least one embodiment of the present invention.

FIG. 3 is a flowchart illustrating operational steps for the program 104 analyzing the number of burnt physical sensors located within a computing device 102.

At step 302, the program 104 transmits a signal to physical sensors associated with respective counts within the computing device 102. In this embodiment, the program 104 transmits a signal to physical sensors associated with at least two counts after the physical sensors are burned. In this embodiment, the program 104 transmits instructions to an electronic key after locating physical sensors to activate the physical sensors, and this causes the physicals sensors to burn.

At step 304, the program 104 receives input from physical sensors within the computing device 102. In this embodiment, the program 104 receives signals from physicals sensors that were not burned or physical sensors that are compromised. In this embodiment, a physical sensor that was previously activated by an electronic key or received a signal from the program 104 burns. In this embodiment, a physical sensor that is burned is unable to return a signal to the program 104, which defines a compromised physical sensor.

At step 306, the program 104 inspects the status of physical sensors associated with respective counts within the computing device 102. In this embodiment, the program 104 uses a self-verifying accounting system to inspect the status of the physical sensors within the computing device 102. The self-verifying accounting system counts the number of burnt physical sensors and cross-verifies the number of burnt physical sensors with the number of signals the program 104 transmitted to the physical sensors within the computing device 102. In another embodiment, the program 104 cross-verifies the status of the physical sensors across multiple platforms and devices.

Figure 4:
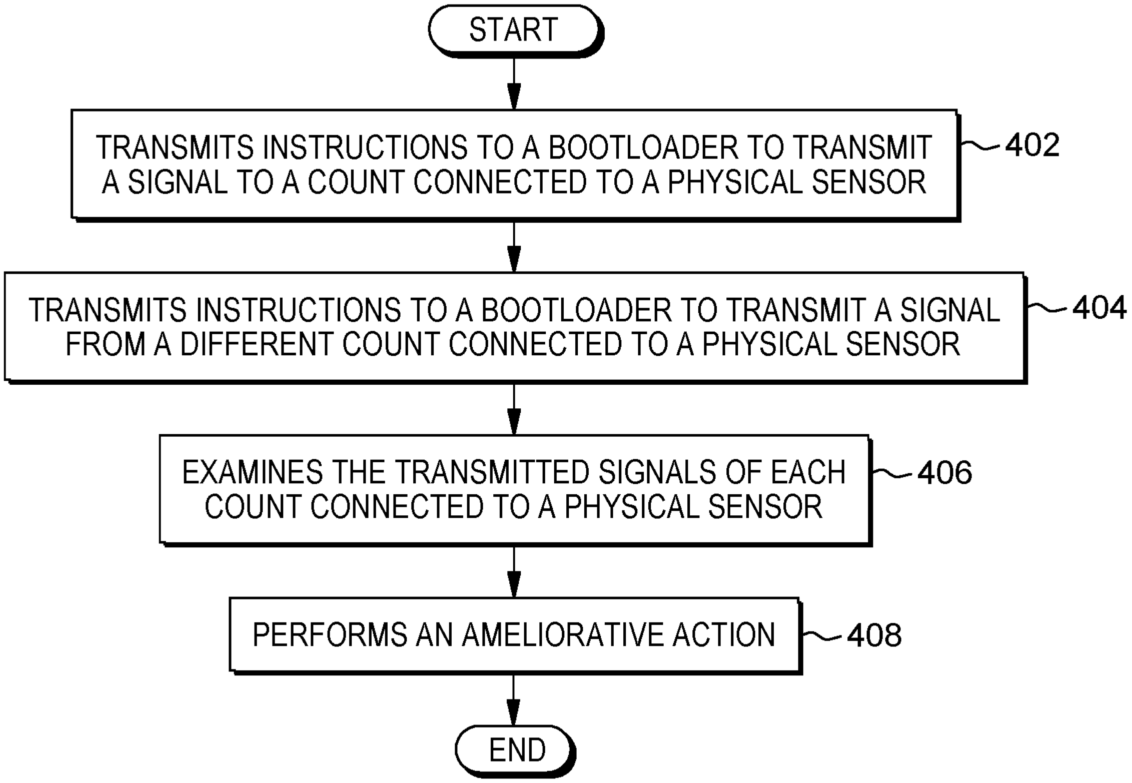
FIG. 4 is a flowchart illustrating operational steps for securing external communication in an ATM using a bootloader, in accordance with at least one embodiment of the present invention.

FIG. 4 is a flowchart illustrating operational steps for securing external communication in an ATM using a boot-loader.

At step 402, the program 104 transmits instructions to a bootloader to transmit a signal to a count connected to a physical sensor located within the computing device 102. In this embodiment, the program 104 transmits instructions to a bootloader to transmit a signal to at least a first count connected to the physical sensor located on the operating system of the computing device 102 and a second count connected to the physical sensor located on the cash dispenser. A bootloader is defined as a device that loads an operating system from a storage device, sets up a minimal environment in which the operating system can run, and runs the operating system's start-up procedure. In this embodiment, the program 104 is stored locally on the bootloader within the computing device 102. For example, the program 104 transmits instructions to the bootloader to transmit signals to physical sensors located within the ATM. In another embodiment, the program 104 transmits instructions to a bootloader to establish an environment that allows for communication with each physical sensor located within the computing device 102.

At step 404, the program 104 transmits instructions to the bootloader to transmit a signal from a different count connected to a physical sensor located in the computing device 102. In this embodiment, the program 104 transmits instructions to a bootloader to transmit a signal to a different physical sensor. In another embodiment, the program 104 may instruct the bootloader to transmit differing signals to at least two counts connected to physical sensors located within the computing device 102. For example, the program 104 transmits instructions to the bootloader transmit a signal to the first count connected to a physical sensor located on the operating system; and subsequent to those instructions, the program 104 transmits instructions to the bootloader to transmit a different signal to the second count connected to a physical located on the cash dispenser. In another embodiment, the program 104 transmits instructions to a bootloader to establish an environment that allows for communication with each e-fuse located within the computing device 102.

At step 406, the program 104 examines the transmitted signals of each count connected to a physical sensor located within the computing device 102. In this embodiment, the program 104 analyzes the status of each physical sensor using a self-verifying accounting system. In this embodiment, the program 104 transmits instructions to the bootloader to verify the status of at least the first count connected to a physical sensor and the second count connected to a physical sensor. In this embodiment and in response to the program 104 transmitting signals to the physical sensors, the physical sensors burn. In response to the burning of the physical sensors, the program 104 fails to receive a return signal from the physical sensors. For example, the program 104 transmits instructions to the bootloader to transmit a signal to the physical sensors located within the ATM; and in response to receiving the transmitted signal, the program 104 transmits instructions to the bootloader to self-verify the status of the physical sensors that received the transmitted signal using the self-verifying accounting system.

At step 408, the program 104 performs an ameliorative action. In this embodiment, the program 104 automatically halts the transmission of the computing device 102. In this embodiment and in response to failing to authenticate the transmitted signals of the physical sensors, the program 104 transmits instructions to the bootloader to automatically halt the transmission of the computing device 102. In this embodiment, the program 104 transmits these instructions to the bootloader in response to the bootloader examining the status of the physical sensors and determining an irregularity. An irregularity is defined as any event or status of that fails to authenticate the transmitted signal. The irregularity can come in the form of the number of burnt physical sensors in relation to the number of transmitted signals. In this embodiment, the program 104 transmits instructions to the bootloader to halt the transmission of the computing device 102 using out of band communication. Out of band communication removes the requirement of the server computing device 108. In another embodiment, the program 104 transmits instructions to the bootloader to perform the transmission on the computing device 102. In this embodiment, the program 104 authenticates the signals from the physical sensors associated with counts using the self-verification accounting system and transmits instructions to the bootloader to perform the transmission. In another embodiment and in response to the program failing to authenticate signals from the physical sensors associated with counts, the program 104 transmits instructions to the bootloader to transmit a notification to the computing device 102. In this embodiment, the bootloader transmits a notification to an operator, bank, or authorities that details the reasoning for halting the transmission, the type of attack that was attempted on the computing device 102, the time of the attack, and stalling tactics to allow the authorities to reach the computing device 102.

Figure 5:
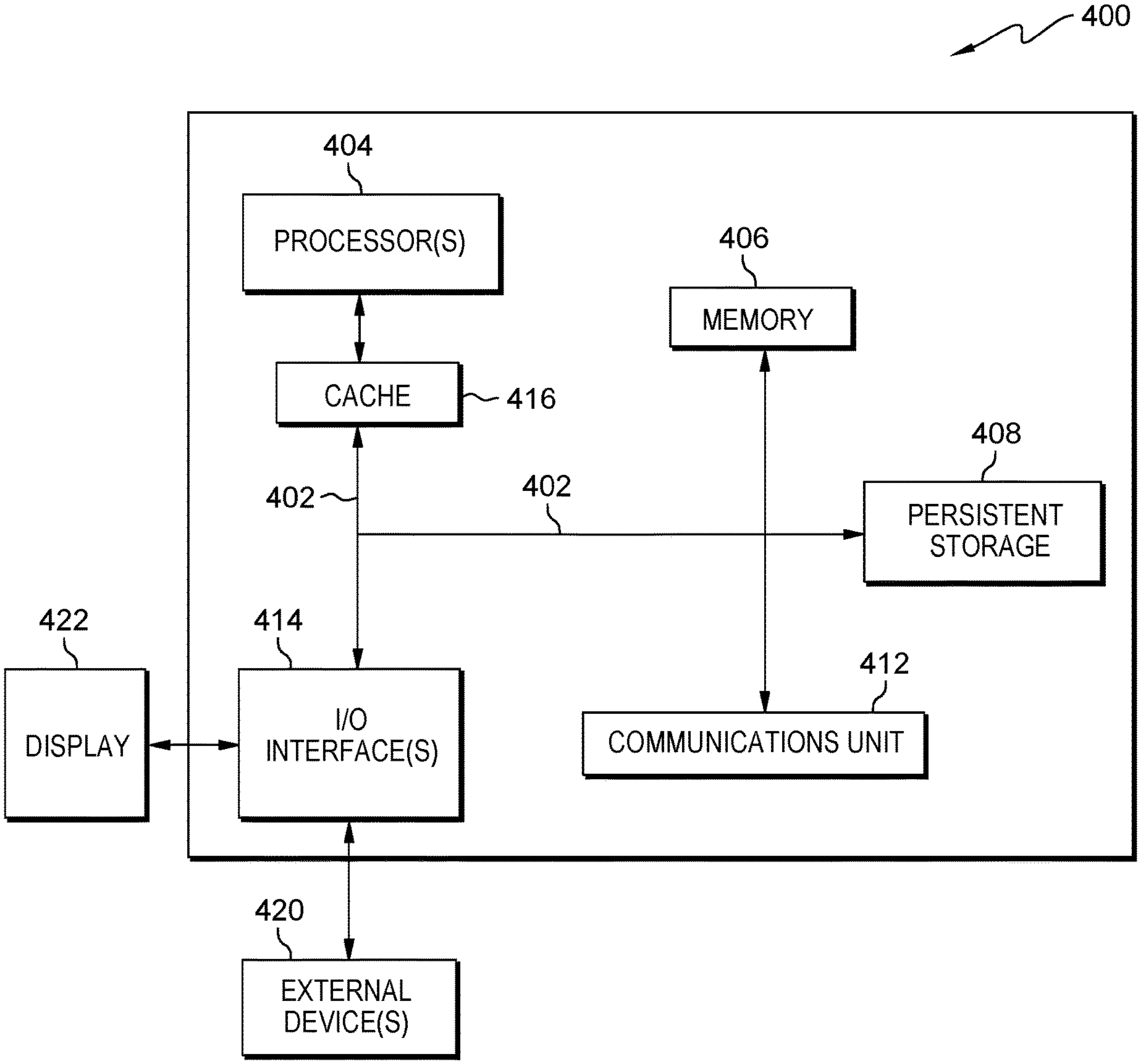
FIG. 5 depicts a block diagram of components of computing systems within a computing environment of FIG. 1, in accordance with an embodiment of the present invention.

FIG. 5 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 500 includes a communications fabric 502, which provides communications between a cache 516, a memory 506, a persistent storage 508, a communications unit 510, and an input/output (I/O) interface(s) 512. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 includes one or more network interface cards. The communications unit 510 may provide communications through the use of either or both physical and wireless communications links. The program 104 may be downloaded to the persistent storage 508 through the communications unit 510.

The I/O interface(s) 512 allows for input and output of data with other devices that may be connected to a mobile device, an approval device, and/or the server computing device 108. For example, the I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 512. The I/O interface(s) 512 also connect to a display 520.

The display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

identifying at least a first physical sensor and a second physical sensor of a plurality of physical sensors within an ATM, wherein each physical sensor is an e-fuse located within the ATM;

in response to receiving instructions to perform a command, performing a predetermined operation within the ATM;

in response to performing the predetermined operation, authenticating the received instructions to perform the command on at least the first physical sensor and the second physical sensor identified within the ATM; and in response to failing to authenticate a received command, on at least the first physical sensor and the second physical sensor identified within the ATM, automatically halting a transmission associated with the predetermined operation.

2. The computer-implemented method of claim 1, wherein identifying at least the first physical sensor comprises:

accessing schematics of the computing device;

locating at least the first physical sensor; and transmitting instructions to at least the first physical sensor to give count types, wherein the count types are based on the burning of a physical sensor in response to a type of count being transmitted to the first physical sensor.

3. The computer-implemented method of claim 1, wherein identifying at least the first physical sensor comprises identifying a number of physical sensors that are located within the computing device by performing a diagnostic test.

4. The computer-implemented method of claim 1, wherein performing the predetermined operation comprises burning a physical sensor.

5. The computer-implemented method of claim 1, wherein a physical sensor comprises an e-fuse located with an automated teller machine.

6. The computer-implemented method of claim 1, wherein authenticating the received instructions to perform a command on at least the first physical sensor comprises:

transmitting a signal to the first physical sensor to give a count;

receiving input from the first physical sensor based on the count; and inspecting the count received by the first physical sensor.

7. The computer-implemented method of claim 6, wherein inspecting the count of the first physical sensor comprises using a self-verifying accounting system.

8. The computer-implemented method of claim 1, further comprising transmitting a notification to a server computing device.

9. The computer-implemented method of claim 1, further comprising authenticating the received instructions to perform a command on a bootloader comprises:

transmitting a signal to the bootloader to give a count, wherein the count is a number of burnt physical sensors associated with the performed command;

receiving input from the bootloader based on the count; and inspecting the count received by the bootloader.

10. A computer program product comprising:

one or more computer readable storage media and program instructions stored on the one or more computer readable storage media, the program instructions comprising:

program instructions to identify at least a first physical sensor and a second physical sensor within an ATM, wherein each physical sensor is an e-fuse located within the ATM;

in response to receiving instructions to perform a command, program instructions to perform a predetermined operation within the ATM;

in response to performing the predetermined operation, program instructions to authenticate the received instructions to perform the command on at least the first physical sensor and the second physical sensor identified within the ATM; and in response to failing to authenticate a received command, on at least the first physical sensor and the second physical sensor identified within the ATM, program instructions to automatically halt a transmission associated with the predetermined operation.

11. The computer program product of claim 10, wherein program instructions to identify at least the first physical sensor and the second physical sensor within the computing device comprises:

program instructions to access schematics of the computing device;

program instructions to locate at least the first physical sensor; and program instructions to transmit instructions to at least the first physical sensor to give count types, wherein the count types are based on the burning of a physical sensor in response to a type of count being transmitted to the first physical sensor.

12. The computer program product of claim 10, wherein program instructions to identify at least the first physical sensor and a second physical sensor within a computing device comprises program instructions to identify a number of physical sensors that are located within the computing device by performing a diagnostic test.

13. The computer program product of claim 10, wherein program instructions to perform the predetermined operation within the computing device comprises program instructions to burn a physical sensor.

14. The computer program product of claim 10, wherein program instructions to authenticate the received instructions to perform a command on at least the first physical sensor and the second physical sensor identified within the computing device comprises:

program instructions to transmit a signal to the first physical sensor to give a count;

program instructions to receive input from the first physical sensor based on the count; and program instructions to inspect the count received by the first physical sensor.

15. The computer program product of claim 14, wherein program instructions to inspect the count received by the first physical sensor comprises program instructions to use a self-verifying accounting system.

16. A computer system comprising:

one or more computer processors;

one or more computer readable storage media; and program instructions stored on the one or more computer readable storage media for execution by at least one of the one or more processors, the program instructions comprising:

program instructions to identify at least a first physical sensor and a second physical sensor within an ATM, wherein each physical sensor is an e-fuse located within the ATM;

in response to receiving instructions to perform a command, program instructions to perform a predetermined operation within the ATM;

in response to performing the predetermined operation, program instructions to authenticate the received instructions to perform the command on at least the first physical sensor and the second physical sensor identified within the ATM; and in response to failing to authenticate a received command, on at least the first physical sensor and the second physical sensor identified within the ATM, program instructions to automatically halt a transmission associated with the predetermined operation.

17. The computer system of claim 16, wherein program instructions to identify at least the first physical sensor and the second physical sensor within the computing device comprises:

program instructions to access schematics of the ATM;

program instructions to locate at least the first physical sensor; and program instructions to transmit instructions to at least the first physical sensor to give count types, wherein the count types are based on the burning of a physical sensor in response to a type of count being transmitted to the first physical sensor.

18. The computer system of claim 16, wherein program instructions to identify at least a first physical sensor and a second physical sensor within a computing device comprises program instructions to identify a number of physical sensors that are located within the computing device by performing a diagnostic test.

19. The computer system of claim 16, wherein program instructions to perform the predetermined operation within the computing device comprises program instructions to burn a physical sensor.

20. The computer system of claim 16, wherein program instructions to authenticate the received instructions to perform a command on at least the first physical sensor and the second physical sensor identified within the computing device comprises:

program instructions to transmit a signal to the first physical sensor to give a count, wherein the count is a number of burnt physical sensors associated with the performed command;

program instructions to receive input from the first physical sensor based on the count; and program instructions to inspect the count received by the first physical sensor.

* * * * *